United States Patent [19]

Dunn

[11] Patent Number: 4,762,255

[45] Date of Patent: Aug. 9, 1988

[54] BICYCLE EQUIPMENT CARRIER APPARATUS

[76] Inventor: John J. Dunn, 4 Bancroft St., Wilmington, Mass. 01887

[21] Appl. No.: 938,255

[22] Filed: Dec. 5, 1986

[51] Int. Cl.[4] .................................................. B62J 9/00
[52] U.S. Cl. ................................ 224/32 R; 224/30 R; 224/911; 224/919; 280/289 R
[58] Field of Search ............ 224/273, 30 R, 31, 32 R, 224/32 A, 39, 42.12, 42.13, 42.15, 42.24, 42.26, 919, 922; 280/289 R, 289 A; 206/315.9

[56] References Cited

U.S. PATENT DOCUMENTS

| 475,174 | 5/1892 | Barbour | 224/32 R |
|---|---|---|---|
| 482,938 | 9/1892 | Blood | 224/32 R |
| 639,708 | 12/1899 | Certain | 224/32 A |
| 1,610,344 | 12/1926 | Williams | 224/919 X |
| 1,963,333 | 6/1934 | Morales | 224/32 A |
| 2,950,748 | 8/1960 | Olinghouse | 224/919 X |
| 3,039,663 | 6/1962 | Glenny | 224/32 A |
| 3,167,284 | 1/1965 | Lynch | 224/32 R |
| 3,744,688 | 7/1973 | Kezer | 224/32 R |
| 3,934,770 | 1/1976 | Larsen | 224/33 |
| 4,295,586 | 10/1981 | Schockley | 224/32 R |
| 4,353,490 | 10/1982 | Jackson et al. | 224/32 A |
| 4,577,786 | 3/1986 | Dorwick et al. | 224/32 A |
| 4,671,438 | 6/1987 | La Plante | 224/32 A |

FOREIGN PATENT DOCUMENTS

| 8304230 | 12/1983 | European Pat. Off. | 224/32 A |
|---|---|---|---|
| 66863 | 10/1947 | Norway | 224/32 A |
| 734278 | 7/1955 | United Kingdom | 224/32 A |

Primary Examiner—Henry J. Recla
Assistant Examiner—Ernest G. Cusick
Attorney, Agent, or Firm—Joseph S. Iandiorio; William E. Noonan; Douglas E. Denninger

[57] ABSTRACT

The bicycle equipment carrier apparatus which includes a support section adapted for mounting to a bicycle frame adjacent the rear wheel of the bicycle. The support section includes a plate portion and an elongate receptacle for accommodating items therein. A web is attached to the support section to form a container for holding items therein.

17 Claims, 2 Drawing Sheets

BICYCLE EQUIPMENT CARRIER APPARATUS

FIELD OF INVENTION

This invention relates to a bicycle equipment carrier apparatus and more particularly to a bicycle carrier for transporting sports equipment such as baseball bats, tennis racquets, fishing rods and hockey sticks along with balls and other assorted items.

BACKGROUND OF THE INVENTION

A variety of bicycle carriers are presently used to transport sporting goods and similar equipment. However, although these carriers are usually adequate for accommodating gloves, helmets, towels, uniforms and clothing, they are typically not satisfactory for transporting elongate or cumbersome items such as baseball bats, tennis racquets, hockey sticks and fishing rods. Conventional carriers typically permit such elongate equipment to bounce around and shift position drastically as the bicycle is ridden thereby interfering with operation of the bicycle and occasionally extending dangerously into the path of other bicyclists or pedestrians. Moreover, present carriers are often too shallow to securely support elongate sports equipment and, as a result, the equipment may fall out of the carrier. Therefore, these features are not only an annoyance, they also pose a safety hazard both to the rider and to those around him.

Currently, the only alternative available to the rider has been for him to carry the elongate item in one hand while steering with the other hand. This is both awkward and dangerous. The number of items which can be transported in this manner is also quite limited.

SUMMARY OF THE INVENTION

It is therefore an object of this invention to provide a bicycle equipment carrier apparatus which effectively, safely and securely transports both elongate and smaller sized items.

It is a further object of this invention to provide such a carrier apparatus which is particularly effective for holding both elongate sports equipment such as bats, racquets, sticks and fishing rods and miscellaneous items such as balls, gloves, fishing tackle, towels and clothing.

It is a further object of this invention to provide a bicycle equipment carrier apparatus which restricts movement of the equipment being transported and prevents that equipment from hindering the rider of the bicycle or injuring passersby.

It is a further object of this invention to provide a bicycle equipment carrier apparatus which does not disturb the balance of the bicycle or interfere with mounting or dismounting of the bicycle.

It is a further object of this invention to provide a lightweight bicycle equipment carrier which is simply and securely fastened to a bicycle frame.

It is a further object of this invention to provide such a carrier which effectively avoids collecting rainwater.

This invention features a bicycle equipment carrier apparatus which includes a support section adapted from mounting to a bicycle frame adjacent the rear wheel of the bicycle and including a plate portion and an elongate receptacle for accommodating items therein. There are web means attached to the support section to form a container for holding items therein.

In a preferred embodiment, the support section includes a pair of elongate receptacles. The web means may include first and second edges attached respectively to said receptacles and may further include a mesh-like bottom portion for draining liquid from the container. A bottom edge of the web means may be attached to the plate portion. The receptacle may include a mesh-like lower end, and the mesh-like lower end of the receptacle and mesh-like bottom portion of the container may form a unitary piece. The elongate receptacle may include a tubular member and there may be first closure means for selectively closing one end of the elongate receptacle and second closure means for selectively closing the opposite end of the receptacle. The receptacle may include a longitudinal slot extending from the entrance of the receptacle for accommodating equipment which extends from the receptacle.

There may be means attached to the plate portion for securing equipment which extends from the receptacle. There also may be means attached to the plate portion and engageable with the web portion for securing equipment in the container. The support section may include means for attaching the plate portion to the bicycle frame at three separate locations.

BRIEF DESCRIPTION OF THE DRAWINGS

Other objects, features and advantages will occur from the following description of a preferred embodiment and the accompanying drawings, in which.

DESCRIPTION OF THE PREFERRED EMBODIMENT

Figure 1:
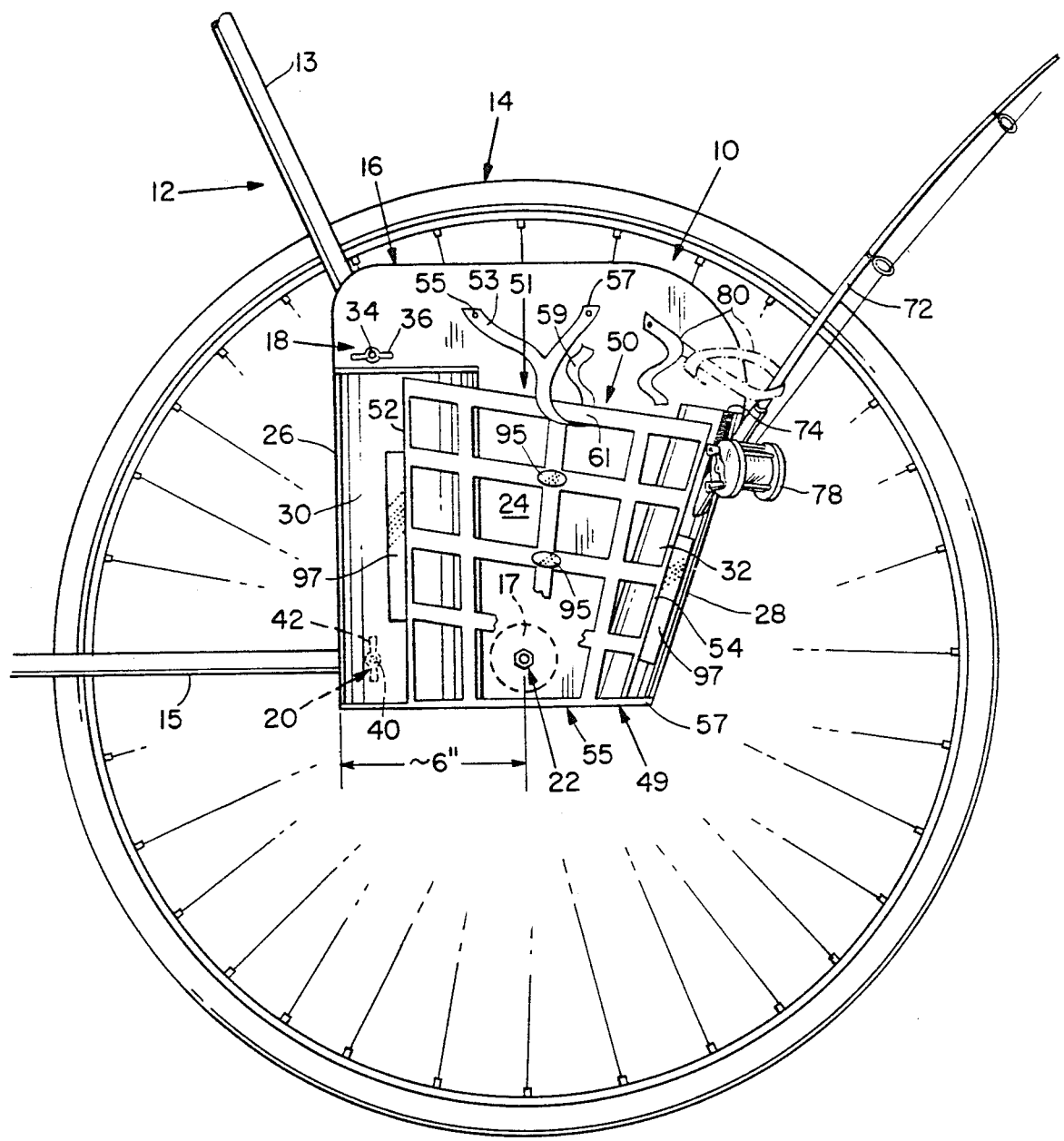
FIG. 1 is an elevational view of a bicycle equipment carrier according to this invention attached adjacent the rear wheel of a bicycle.

A bicycle equipment carrier apparatus according to this invention includes a support section that is mounted such as by nuts and bolts or similar means to a bicycle frame adjacent the rear wheel of the bicycle. The support section includes a plate portion which is constructed of wood, fiberglass, plastic or similar sturdy but lightweight material. At least one, and preferably two, elongate and typically tubular receptacles are attached to the plate portion. For example, a pair of longitudinal receptacles may be mounted generally vertically along opposite edges of the mounting plate. Such attachment is typically made by suitable bolts and nuts. Alternatively, various epoxies, adhesives and other attachment means may be employed.

Webbing or other mesh-like means are attached to the support section to form a container for holding objects such as gloves, towels and clothing. As used herein "web" or "mesh" refers to any material having a pattern of multiple openings. These openings may be large or small and the web may be constructed of wood, plastic, a fabric, an elastic substance, metal or other lightweight but durable material. A webbed wall portion is typically attached, such as by an adhesive, to the two receptacles. The bottom of the container is typically formed by a mesh or screen portion which is attached between the webbed wall portion and the support plate. The mesh-like bottom portion may also extend to form the bottom of one of the receptacles. This mesh-like bottom permits rainwater or other liquids to be effectively drained from the container and the receptacle.

The receptacles are typically constructed of material which is similar to that which composes the plate. They are likewise lightweight so that they do not hinder the balance of the bicycle. One or more of the receptacles may be provided with first closure means for selectively closing one end of the receptacle and second closure means for selectively closing the opposite end. This permits baseballs, tennis balls and similar items to be easily loaded into and unloaded from the carrier and at the same time prevents such items from being dropped and lost during transport. One or more of the receptacles may include a longitudinal slot which extends from the entrance of the receptacle for accommodating equipment such as fishing rods and tennis rackets that have portions which are too large to fit within the receptacle.

A strap, elastomeric band or similar means may be attached to the plate portion for securing equipment which extends from a receptacle. An additional strap or band may be engageable with the webbed wall portion for securing equipment in the container.

Typically, the support section is mounted at three points to the bicycle frame, for example, to the hub and to the generally horizontal and diagonal frame elements which emanate from the hub. This permits the equipment carrier to be securely supported by the bicycle frame without interfering with either the rider or persons in the vicinity of the bicycle.

Figure 2:
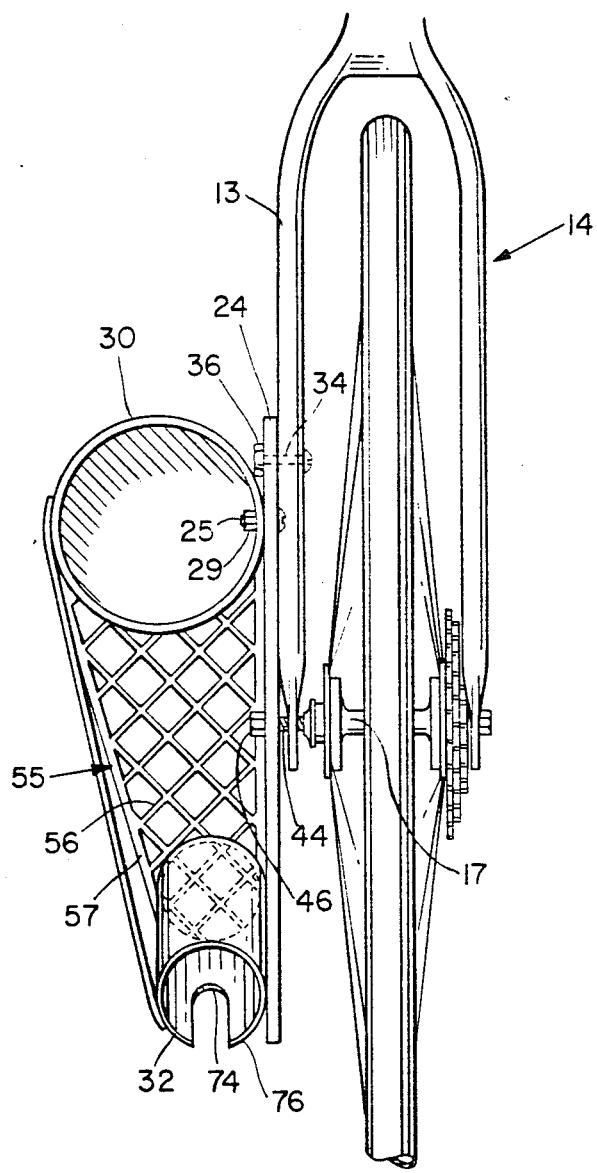
FIG. 2 is a top plan view of the bicycle equipment carrier.
Figure 3:
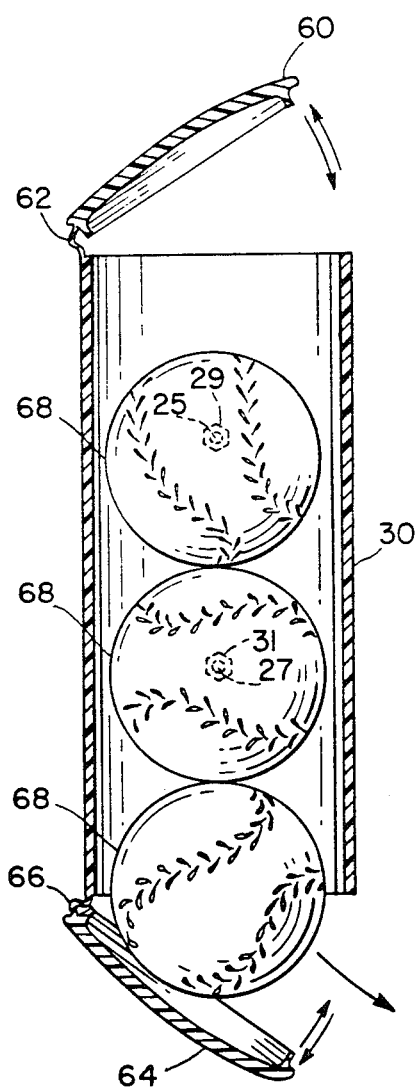
FIG. 3 is a cutaway view of a ball holding receptacle used in the equipment carrier.

There is shown in FIG. 1 a bicycle equipment carrier apparatus 10 which is mounted on bicycle frame 12 adjacent to rear wheel 14. The rearward portion of frame 12 includes a diagonal frame element 13 and a generally horizontal frame element 15 which emanate from hub 17 of rear wheel 14. Apparatus 10 includes a support structure 16 which is mounted by nut/bolt attachments 18, 20 and 22 to frame 12. More specifically, support section 16 includes a plate portion 24 having a forward edge 26 and a tapered rearward edge 28. An elongate cylindrical receptacle 30 is attached to plate 24 along forward edge 26. This attachment is made, as shown in FIGS. 2 and 3, by bolts 25 and 27 which extend through plate 24 and receptacle 30 and nuts 27, 31 which are secured to bolts 25 and 27 respectively. A second tubular receptacle 32 is similarly attached along tapered rearward edge 28 of plate 24.

As shown in FIGS. 1 and 2, bolt 34 of attachment means 18 extends through diagonal frame element 13 and mounting plate 24 and the plate is secured against element 13 by wing nut 36. Similarly, bolt 40 of attachment 20 extends through horizontal frame element 15 and plate 24 and is secured in place by wing nut 42. As shown most clearly in FIG. 2, a threaded axle 44 extends from hub 17 for mounting wheel 14 on frame 12 in a conventional manner. Axle 44 also extends through mounting plate 24 of apparatus 10 and the plate is secured to the axle and therefore to hub 17 by a nut 46.

A container 49 is attached to support section 16. The wall of container 49 is formed by a piece of webbing 50 which is attached such as by a suitable adhesive along side strips 52 and 54 to receptacles 30 and 32, respectively. A plurality of reflectors 95 may be attached such as by a suitable adhesive to webbing 50 and elongate reflectors or reflective tape 97 may be applied to receptacles 30 and 32. The bottom of container 49 is formed by a mesh portion 55. As shown most clearly in FIG. 2, portion 55 includes a mesh or screen element 56 which is surrounded by a frame 57. The frame is attached, such as by an adhesive or tabs, to plate 24. As illustrated in FIG. 1, it is generally level with the bottom end of receptacle 30 and extends from that receptacle to beneath receptacle 32. As a result, screen element 56 forms a bottom for both container 49 and receptacle 32. This enables rainwater to effectively drain from both the container and the receptacle. Frame 57 may be attached by an adhesive to the bottom edge of receptacle 32.

Receptacle 30, FIG. 3, includes an upper lid or closure 60 which is integrally attached to receptacle 30 by a hinge 62. Similarly, a lower closure 64 is integrally attached to the bottom end of receptacle 30 by a hinge 66. Receptacle 30 is provided with a diameter which is sufficient to accommodate balls 68. To place balls 68 in carrier apparatus 10, lower closure 64 is shut and upper closure 60 is opened so that the balls may be inserted in receptacle 30. After the rider has arrived at his destination, balls 68 are removed from receptacle 30 simply by opening lower closure 64 so that the balls fall out from the receptacle.

Receptacle 32 includes an inside diameter which is sufficient for accommodating an elongate item such as fishing rod 72, FIG. 1. Alternatively, various other items such as baseball bats, golf clubs or tennis rackets may be accommodated within receptacle 32. That receptacle includes a longitudinal slot 74 which extends from entrance 76 for part of the length of the receptacle. Slot 74 accommodates rod 72 while permitting a reel 78 carried by rod 72 to rest against the outside of receptacle 32. Without such a slot the reel would block the introduction of rod 72 into receptacle 32. An elastic strap 80 is attached by an adhesive or a rivet to plate 24. As shown in phantom, strap 80 may be wrapped about rod 72 and tied so that the rod is secured in place and prevented from accidentally bouncing out of receptacle 32 as the bike is ridden.

Container 49 includes a size which is sufficient for accommodating towels, baseball gloves, footballs, and various other items. The webbing is preferably composed of an elastomeric material which is able to expand somewhat to accommodate loads of varying sizes. After such items have been loaded into the webbed container, the upper open end 51 is closed by a "Y"-shaped strap 53. The strap includes legs 55 and 57 which are attached by an adhesive or rivets to plate 24. A loose end 59 is wrapped about the upper horizontal strap 61 of webbing 50 and tied, such as at the junction of legs 55 and 57 so that open end 51 is closed.

A preferred apparatus 10 includes a plate portion 24 which is approximately 12 inches by 12 inches. Receptacle 30 includes an inside diameter of approximately 4 inches and is approximately 9 inches in height. This enables the receptacle to accommodate several of a wide variety of balls such as softballs, baseballs and tennis balls. Elongate receptacle 32 includes a smaller inside diameter, for example, two inches. It is likewise 9 inches in height. Such dimensions enable it to securely accommodate various elongate items such as baseball bats, hockey sticks, fishing rods, tennis racquets and golf clubs. The longitudinal slot 74 is approximately one inch wide by four inches long. Because the larger diameter receptacle 30 extends only approximately four inches from plate 24, apparatus 10 remains very close to and compact around frame 12 and does not hinder the rider or interfere with operation of the bicycle or passers-by. The above dimensions are for illustrative purposes only and are not intended to limit this invention.

Although specific features of the invention are shown in some drawings and not others, this is for convenience only as each feature may be combined with any or all of the other features in accordance with the invention.

Other embodiments will occur to those skilled in the art and are within the following claims:

What is claimed is:

1. An equipment carrier apparatus attachable to the frame of a bicycle, comprising:
   a plate portion having a forward end, a rearward end, and a bottom;
   at least one elongate receptacle disposed proximate one of said ends and having an entrance for accommodating items therein;
   web means having a bottom, forward, and rearward edges attached at said bottom edge to the bottom of said plate portion, and attached at each of said forward and rearward edges to one of said at least one elongate receptacle and said plate portion; and
   said web means, said plate portion and said receptacle defining among them a container for holding items therein.

2. The apparatus of claim 1 in which said web means includes a mesh-like bottom portion for draining liquid from said container.

3. The apparatus of claim 2 in which said at least one elongate receptacle includes a mesh-like lower end.

4. The apparatus of claim 3 in which said web means includes a mesh-like bottom portion and said mesh-like lower end and mesh-like bottom portion form a unitary piece.

5. The apparatus of claim 1 in which said at least one elongate receptacle includes a tubular member.

6. The apparatus of claim 1 further including means, attached to said plate portion, for securing equipment which extends from said at least one elongate receptacle.

7. The apparatus of claim 1 further including means attached to said plate portion and engageable with said web means for securing equipment in said container.

8. The apparatus of claim 1 in which said at least one elongate receptacle includes a longitudinal slot extending from the entrance of said at least one elongate receptacle for accommodating equipment which extends from said at least one elongate receptacle.

9. The apparatus of claim 1 in which said at least one elongate receptacle includes an opening opposite said entrance for removing items therein.

10. The apparatus of claim 9 further including first closure means for selectively closing one of said entrance and said opening of said at least one elongate receptacle.

11. The apparatus of claim 10 further including second closure means for selectively closing the other of said entrance and said opening.

12. The apparatus of claim 1 further including means for mounting said plate portion to the frame of the bicycle.

13. The apparatus of claim 12 in which said means for mounting includes means for attaching said plate member to the bicycle frame at three separate locations.

14. The apparatus of claim 1 further including a second elongate receptacle disposed proximate the other of said ends of said plate member.

15. The apparatus of claim 14 in which said web means is attached at its forward and rearward edges to said first and second receptacles.

16. The apparatus of claim 1 in which said at least one elongate receptacle is removable from said plate member.

17. An equipment carrier apparatus attachable to the frame of a bicycle, comprising:
   a plate portion having a forward end, a rearward end, and a bottom;
   a first rigid elongate receptacle, disposed proximate one of said ends, having an entrance for accommodating items therein, and having an opening opposite said entrance for removing items therein;
   second rigid elongate receptacle disposed proximate the other of said ends of said plate member;
   web means having a bottom, forward, and rearward edges attached at said bottom edge to the bottom of said plate portion, and attached at each of said forward and rearward edges to one of said receptacles;
   said web means, said plate portion and said receptacles defining among them a container for holding items therein; and
   means for mounting said plate portion to the frame of the bicycle.

* * * * *